United States Patent Office 3,560,342
Patented Feb. 2, 1971

3,560,342
PROCESS FOR PRODUCING OROTIDYLIC ACID
Kiyoshi Nakayama, Sagamihara-shi, and Haruo Tanaka, Machida-shi, Japan, assignors to Kyowa Hakko Kogyo Co., Ltd., Tokyo, Japan
Filed Apr. 15, 1968, Ser. No. 721,189
Claims priority, application Japan, Apr. 18, 1967, 42/24,209; June 24, 1967, 42/40,141
Int. Cl. C12d 13/06
U.S. Cl. 195—28   19 Claims

ABSTRACT OF THE DISCLOSURE

A process for producing orotidylic acid by fermentation which comprises culturing a microorganism belonging to the genus Brevibacterium, Corynebacterium, Arthrobacter or Microccus in an aqueous nutrient medium and adding to the medium, either prior to the initiation of culturing or during culturing, 6-azauracil, 5-hydroxyuracil, ribosides or ribotides of these compounds, or mixtures thereof. Orotic acid or arotidine may also be added to the medium.

---

This invention relates to a process for producing orotidylic acid. More particularly, it relates to a process for the production of orotidylic acid by fermentation. Even more particularly, the invention relates to a process for producing orotidylic acid by fermentation using bacteria.

Orotidylic acid has been produced by chemical synthetic methods in the prior art [Journal of the American Chemical Society, vol. 76, 5056 (1954)]. Enzymatic methods have also been employed [Journal of Biological Chemistry, vol. 215, 403 (1955); id., vol. 235, 2379 (1960)]. However, these methods are not suited for industrial production because the starting materials are expensive, the yields are low, etc. Therefore, as far as the production of orotidylic acid is concerned, at the present time there is no advantageous process available for the industrial production thereof.

One of the objects of the present invention is to provide an improved process for the production of orotidylic acid which overcomes the disadvantages and deficiencies of the prior art methods.

Another object of the present invention is to provide a process for producing orotidylic acid by fermentation which may be carried out in an efficacious and simple manner.

A further object of the invention is to provide a process for producing orotidylic acid by fermentation which may be carried out advantageously on an industrial scale at low cost to give a high yield of product.

A still further object of the invention is to provide orotidylic acid.

These and other objects and advantages of the present invention will become apparent to those skilled in the art from a consideration of the following specification and claims.

As the result of various investigations on a process for producing orotidylic acid, especially from the viewpoint of the utilization of microorganisms in order to overcome the disadvantages of the prior art, the present inventors have found that significant amounts of orotidylic acid are produced and accumulated in a cultured liquor when culturing is conducted with particular microorganisms in the presence of 6-azauracil, 5-hydroxyuracil, ribosides or ribotides of these compounds or mixtures thereof. Or, high yields of orotidylic acid may be obtained by fermentation by simultaneously adding one or more kinds of compounds selected from the group consisting of 5-azauracil, 5-hydroxyuracil, ribosides or ribotides of 6-azauracil or 5-hydroxyuracil and orotic acid or oroticline to the culture medium at any time during culturing. This phenomenon has been unknown to the prior art.

Orotidylic acid is also called orotidine-5'-phosphoric acid and has the following structural formula:

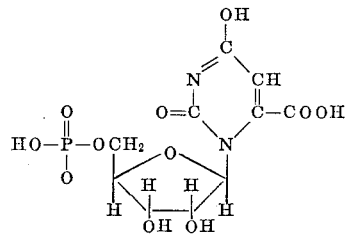

Orotidylic acid is important as an intermediate in the synthesis of nucleic acid. It also is a valuable biochemical reagent.

As noted above, the most significant characteristic of the present invention is the step of adding to the culture medium at least one of the compounds 6-azauracil, 5-hydroxyuracil or ribosides or ribotides thereof, either with or without simultaneously adding thereto orotic acid or orotidine.

The microorganisms to be employed in the present invention are bacterial belonging to the genera Brevibacterium, Corynebacterium, Arthrobacter or Micrococcus.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, glutamic acid, etc. These substances may be used either singly or in mixtures of two or more. As a nitrogen source, various kinds of inorganic or organic salts or compounds, such as urea, liquid ammmonia or ammonia salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc., may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

Moreover, in the case of using strains having particular nutritional requirements, substances which satisfy these nutritional requirements should be added to the culture medium. These include substances such as amino acids, vitamins, biotin, etc.

In accordance with the present invention, compounds selected from the group consisting of 6-azauracil, 5-hydroxyuracil, ribosides or ribotides thereof or mixtures thereof, or said compounds together with precursor amounts of orotic acid or orotidine are added all at one time or intermittently during the course of fermentation. The 6-azauracil and 5-hydroxyuracil can, of course, be added to the culture medium in the form of appropriate salts, such as the sulfate or the hydrochloride.

Orotic acid may be added in the form of the ammonium or the sodium salt thereof.

Various concentrations of the additive compounds may be used. The additive amount of 6-azauracil, 5-hydroxyuracil, or the ribosides or ribotides thereof, is preferably in the range of about 10 μg./ml. to about 2,000 μg./ml. (concentration reduced to the amount of base). The additive amount of orotic acid or orotidine is advantageously in the range of about 100 μg./ml. to about 10 mg./ml. (concentration reduced to the amount of orotic acid). However, it is to be understood that the exact amount of additive used in any given situation varies with the particular microorganisms employed and the culturing conditions. For example, sometimes a higher concentration than those described has a good effect on strains which have a large resistance to the action of growth-inhibition of these compounds.

The addition of the noted compounds to the culture medium can be effected at various times, either before or after inoculation of the microorganisms into the medium.

The fermentation or culturing of the microorganisms is conducted under aerobic conditions, such as aerobic shaking of the culture or with agitation and aeration of a submerged culture, at a temperature of about 20° to 40° C. and at a pH of about 4.0 to 9.5. After about two to eight days of culturing under these conditions, significant amounts of orotidylic acid are produced and accumulated in the culture liquor.

After the completion of culturing, the orotidylic acid can be recovered from the culture liquor by conventional means, such as ion exchange resin treatment, precipitation, adsorption, chromatography or the like.

The following examples are given merely as illustrative of the present invention and are not to be considered as limiting. Unless otherwise noted, the percentages therein and throughout the application are by weight per liter of water.

EXAMPLE 1

*Brevibacterium ammoniagenes* ATCC 6872 is used as the seed strain. It is cultured in a seed culture medium comprising 2% of glucose, 1% of peptone, 1% of yeast extract, 0.3% of NaCl and 30μg./l. of biotin at 30° C.' for 24 hours.

Two ml. of the resultant seed culture is inoculated into a 250 ml. conical flask containing 20 ml. of a fermentation medium sterilized by autoclaving for ten minutes under a pressure of 1 kg./cm². The fermentation medium employed has the following composition:

100 g. glucose
6 g. urea
10 g. $KH_2PO_4$
10 g. $K_2HPO_4$
10 g. $MgSO_4 \cdot 7H_2O$
0.1 g. $CaCl_2 \cdot 2H_2O$
30 μg. biotin
10 g. yeast extract The fermentation medium is prepared by dissolving these ingredients in one liter of water and adjusting the pH thereof to 8.0 with NaOH.

Culturing is then carried out with aerobic shaking of the culture at 30° C. Twenty-four hours after the beginning of culturing, 6-azauracil is added to the medium in the concentration of 1,000 μg./ml. Culturing is then continued for a further 72 hours. After a total culturing time of 96 hours, 0.98 mg./ml. of orotidylic acid is produced and accumulated in the culture liquor.

The orotidylic acid is recovered as an orotidylic acid ammonium salt by passing the culture filtrate obtained by removing the microorganism cells from the culture liquor by centrifugal separation through an ion exchange resin column of polystyrene (Dowex 1, formic acid type). This column, being a strongly basic anion exchange resin, adsorbs the orotidylic acid. The column is then eluted with an aqueous solution of ammonium formate and the resultant fractions containing orotidylic acid are concentrated to dryness. The yield is 0.7 g. from 2 liters of the culture liquor.

EXAMPLE 2

Culturing is conducted in the same manner as described in Example 1, except that 5-hydroxyuracil is added to the medium 72 hours after the beginning of culturing in an amount to give a concentration of 1,000 μg./ml. thereof. Culturing is then continued for another 24 hours. As a result, 0.4 mg./ml. of orotidylic acid is produced and accumulated in the culture liquor.

EXAMPLE 3

Culturing is conducted in the same manner as described in Example 1, except that *Corynebacterium sp.* No. 3485 ATCC 21084 is used as the seed microorganism. The amount of orotidylic acid produced in the resultant culture liquor is 1.0 mg./ml.

EXAMPLE 4

Culturing is again carried out in the same manner as described in Example 1, except that *Arthrobacter sp.* No. 3486 ATCC 21085 is used as the seed strain. The amount of orotidylic acid produced in the resultant culture liquor is 0.42 mg./ml.

EXAMPLE 5

*Micrococcus sodonensis* ATCC 15932 is used as the seed microorganism instead of *Brevibacterium ammoniagenes*, and culturing is conducted as described in Example 1. As a result, the amount of orotidylic acid produced in the culture liquor is 0.69 mg./ml.

EXAMPLES 6(a) AND 6(b)

Culturing is again conducted in the same manner as described in Example 1, except that 6-azauridine in a concentration of 1,500 μg./ml. is added to one medium and that 6-azauridine-5'-phosphoric acid in the concentration of 1,500 μg./ml. is added to a second culture medium. Consequently, the amounts of orotidylic acid produced in the two resultant culture liquors are 0.69 mg./ml. and 0.39 mg./ml., respectively.

EXAMPLE 7

*Brevibacterium ammoniagenes* ATCC 6872 is used as the seed strain. It is cultured in a seed medium containing 2% of glucose, 1% of peptone, 1% of yeast extract, 0.3% of NaCl and 30 μg./l. of biotin at 30° C. for 24 hours.

Two ml. of the resultant seed culture is inoculated into a 250 ml. conical flask containing 20 ml. of a fermentation medium sterilized by autoclaving for ten minutes under a pressuer of 1 kg./cm.². The fermentation medium employed has the following composition:

100 g. glucose
6 g. urea
10 g. $KH_2PO_4$
10 g. $K_2HPO_4$
10 g. $MgSO_4 \cdot 7H_2O$
0.1 g. $CaCl_2 \cdot 2H_2O$
30 μg. biotin
10 g. yeast extract The fermentation medium is prepared by dissolving these components into one liter of water and adjusting the pH thereof to 8.0 with NaOH.

Culturing is then carried out with aerobic shaking of the culture at 30° C. After 72 hours of culturing, 6-azauracil is added to the medium to give a concentration thereof of 1,000 μg./ml. Culturing is then further continued for five hours, and orotic acid is then added to the medium in an amount of 3 mg./ml. Culturing is again continued for a further 24 hours. After culturing has been completed after the total culturing time of 101 hours, 3.3 mg./ml. of orotidylic acid is found to be produced and accumulated in the resultant culture liquor.

The orotidylic acid is recovered as an orotidylic acid ammonium salt by passing a culture filtrate, obtained by removing the microorganism cells from the culture liquor by centrifugal separation, through a strongly basic anion exchange polystyrene resin (Dowex 1, formic acid type). The orotidylic acid is adsorbed on the resin. It is then eluted therefrom with an aqueous solution of ammonium formate, and the fractions containing orotidylic acid are concentrated to dryness. The yield is 1.7 g. from one liter of the culture filtrate.

EXAMPLE 8

Culturing is conducted as described in Example 7, except that 5-hydroxyuracil instead of 6-azauracil is added to the medium in a concentration of 1 mg./ml. 72 hours after the beginning of culturing. Culturing is then continued for another 6 hours, and then orotic acid is added in the concentration of 2 mg./ml. Culturing is then continued an additional 24 hours. Consequently, 1.5 mg./ml. of orotidylic acid is found to be produced and accumulated in the culture liquor.

EXAMPLE 9

The same culturing process as described in Example 7 is conducted, except that orotidine is used instead of orotic acid as the second additive. The amount of orotidylic acid produced is 1.6 mg./ml.

EXAMPLE 10

By adding both 6-azauracil and orotic acid to the medium 72 hours after the beginning of culturing and continuing culturing for an additional 28 hours, the other conditions being the same as described in Example 7, 2.8 mg./ml. of orotidylic acid is produced in the resultant culture liquor.

EXAMPLE 11

Culturing is again conducted as described in Example 7, except that *Corynebacterium sp.* No. 3485 ATCC 21084 is used as the seed strain. The amount of orotidylic acid produced in the culture liquor is 2.3 mg./ml.

EXAMPLE 12

Culturing is carried out as described in Example 7, except that *Arthrobacter sp.* No. 3486 ATCC 21085, instead of *Brevibacterium ammoniagenes,* is used as the seed microorganism. The amount of orotidylic acid produced in the resultant culture liquor is 2.6 mg./ml.

EXAMPLE 13

The same culturing conditions as described in Example 7 are employed, except that *Micrococcus sodonensis* ATCC 15932 is used as the seed strain. The amount of orotidylic acid produced in the culture liquor is 0.7 mg./ml.

EXAMPLES 14(a) AND 14(b)

Again, culturing is carried out as described in Example 7, except that 6-azauridine in a concentration of 1.5 mg./ml. is added to one medium, and 6-azauridine-5'-phosphoric acid in a concentration of 1.5 mg./ml. is added to a second medium, instead of 6-azauracil. The amounts of orotidylic acid produced in the two resultant culture liquors are 2.4 mg./ml. and 1.7 mg./ml., respectively.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing orotidylic acid which comprises culturing a microorganism capable of producing orotidylic acid and belonging to a genus selected from the group consisting of Brevibacterium, Corynebacterium, Arthrobacter and Micrococcus under aerobic conditions in an aqueous nutrient medium containing at least one compound selected from the group consisting of 6-azauracil, 5-hydroxyuracil, ribosides and ribotides thereof, and inorganic salts thereof, accumulating orotidylic acid in the resultant culture liquor, and recovering said orotidylic acid therefrom.

2. The process of claim 1, wherein said microorganism is *Brevibacterium ammoniagenes* ATCC 6872.

3. The process of claim 1, wherein said microorganism is *Corynebacterium sp.* ATCC 21084.

4. The process of claim 1, wherein said microorganism is *Arthrobacter sp.* ATCC 21085.

5. The process of claim 1, wherein said microorganism is *Micrococcus sodonensis* ATCC 15932.

6. The process of claim 1, wherein culturing is carried out at a temperature of about 20° to 40° C. and at a pH of about 4.0 to 9.5.

7. The process of claim 1, wherein said compound is added to the nutrient medium prior to the initiation of culturing.

8. The process of claim 1, wherein said compound is added to the nutrient medium during culturing.

9. The process of claim 1, wherein said nutrient medium contains a concentration of said compound, reduced to the base, of about 10 μg./ml. to about 2000 μg./ml.

10. A process for producing orotidylic acid which comprises culturing a microorganism capable of producing orotidylic acid and belonging to a genus selected from the group consisting of Brevibacterium, Corynebacterium, Arthrobacter and Micrococcus under aerobic conditions in an aqueous nutrient medium containing precursor amounts of orotic acid or orotidine and at least one compound selected from the group consisting of 6-azauracil, 5-hydroxyuracil, ribosides and ribotides thereof, and inorganic salts thereof, accumulating orotidylic acid in the resultant culture liquor, and recovering said orotidylic acid therefrom.

11. The process of claim 10, wherein said microorganism is selected from the group consisting of *Brevibacterium ammoniagenes* ATCC 6872, *Corynebacterium sp.* ATCC 21084, *Arthrobacter sp.* ATCC 21085 and *Micrococcus sodonensis* ATCC 15932.

12. The process of claim 11, wherein culturing is carried out at a temperature of about 20° to 40° C. and a pH of about 4.0 to 9.5.

13. The process of claim 10, wherein said nutrient medium contains a concentration of orotic acid or orotidine, reduced to orotic acid, of about 100 μg./ml. to about 10 mg./ml.

14. The process of claim 10, wherein said nutrient medium contains a concentration of said compound, reduced to the base of about 10 μg./ml. to about 2000 μg./ml.

15. The process of claim 12, wherein said nutrient medium contains a concentration of orotic acid or orotidine, reduced to orotic acid, of about 100 μg.ml. to about 10 mg./ml.

16. The process of claim 1, wherein the additive compound is 6-azauridine or 6-azauridine-5'-phosphoric acid.

17. The process of claim 10, wherein the additive compound is 6-azauridine or 6-azauridine-5'-phosphoric acid.

18. The process of claim 1, wherein said microorganism is selected from the group consisting of *Brevibacterium*

*ammoniagenes, Micrococcus sodonensis, Corynebacterium sp.* ATCC 21084 and *Arthrobacter sp.* ATCC 21085.

19. The process of claim 10, wherein said microorganism is selected from the group consisting of *Brevibacterium ammoniagenes, Micrococcus sodonensis, Corynebacterium sp.* ATCC 21084 and *Arthrobacter sp.* ATCC 21085.

References Cited
UNITED STATES PATENTS

| | | | |
|---|---|---|---|
| 3,369,975 | 2/1968 | Nakayama et al. | 195—28(N) |
| 3,468,759 | 9/1969 | Skoda et al. | 195—28(N) |

ALVIN E. TANENHOLTZ, Primary Examiner